United States Patent Office 2,871,262
Patented Jan. 27, 1959

2,871,262

SYNTHESIS OF ALPHA-METHYLENE CARBOXYLIC ACID ESTERS FROM ALLENE, CARBON MONOXIDE, AND AN ALCOHOL WITH IRON OR RUTHENIUM CARBONYL CATALYSTS

Richard E. Benson, Claymont, Del., assignor to E. I. du Pont de Nemours and Company, Wilmington, Del., a corporation of Delaware No Drawing. Application November 16, 1956
Serial No. 622,526

10 Claims. (Cl. 260—486)

This invention relates to the preparation of carboxylic acid esters. More particularly, this invention relates to a new catalytic process for the preparation of alpha-methylene acid esters, such as methyl methacrylate.

The clarity, brilliance, toughness and optical qualities of poly(methyl methacrylate) make it a unique plastic. Its precursor, monomeric methyl methacrylate, is made commercially by the hydrolysis of acetone-cyanohydrin with sulfuric acid and simultaneous esterification with methanol. In view of the technical and industrial importance of the methacrylates, there is a continuing interest in finding methods which employ readily accessible, low cost intermediates, which simplify equipment requirements, or which reduce operational problems such as corrosion, induced by the surfuric acid in the current commercial process.

It is an object of this invention to provide a novel catalytic process for the preparation of carboxylic acid esters. A further object is to provide a new catalytic process for the preparation of esters of 4 to 8 carbon ethylenically unsaturated carboxylic acids, particularly alpha-methylene carboxylic acid esters. A still further object is to provide a method for preparing such esters from relatively low cost, readily available intermediates. Another object is to provide a process for preparing methacrylic acid esters which simplifies equipment requirements and reduces operational problems encountered in the current commercial process. Other objects will appear hereinafter.

These and other objects of this invention are accomplished by the following process for preparing carboxylic acid esters which comprises reacting allene with carbon monoxide and a monohydric alcohol from the class consisting of alkanols and cycloalkanols in contact with a carbonyl of iron or ruthenium at a temperature of 120 to 250° C. and under a pressure of at least 100 atmospheres. According to this invention carboxylic acid esters, especially methyl methacrylate, dimethyl 2,2-dimethyl-4-methyleneglutarate, and methyl 1-methyl-3-methylenecyclobutanecarboxylate are obtained by reacting allene with carbon monoxide in the presence of methanol and a carbonyl of iron or ruthenium at a temperature of 120 to 250° C. and a pressure of at least 100 atmospheres.

In one method of operation, a pressure reactor is charged with the alcohol and iron or ruthenium carbonyl. The charged reactor is cooled to below −40° C. (allene, B. P. −36° C.) and purged of air by flushing it with oxygen-free nitrogen, sealing and then evacuating. Allene is then added, followed by carbon monoxide. The reactor is placed on an agitating rack and the contents are agitated and heated to a temperature of 120° to 250° C., with further addition of carbon monoxide as required to maintain the pressure between 100 to 3000 atmospheres. After reaction is complete, as evidenced by cessation of pressure drop the reaction mixture is permitted to cool to room temperature, the reactor is discharged and the contents submitted to distillation to isolate the carboxylic acid esters. Other methods known to those skilled in the art for isolating the carboxylic acid esters can of course be used.

The examples which follow illustrate but do not limit this invention.

Example I

A stainless steel pressure reactor of 400 ml. capacity was charged with 150 ml. of methanol and 3 ml. of iron carbonyl. The vessel was flushed with nitrogen and sealed, cooled to −60° C. and evacuated. Allene (40 g.) was added by distillation and carbon monoxide was admitted to a pressure of 300 atmospheres at room temperature. The contents of the vessel were heated at 180° C. for about 12 hours while repressuring with carbon monoxide to approximately 900 atmospheres. The pressure drop corresponded to 255 atmospheres.

Distillation at reduced pressure yielded a yellow liquid (I, 90 ml.) and an almost colorless liquid (II, 65 ml.), B. P. 20–55° C./200 mm.–0.5 mm. The odor of methyl methacrylate was very distinct in the first fraction. A mixture of I (40 ml.) and II (33 ml.) was washed with an aqueous solution of calcium chloride (80 g. of calcium chloride/100 ml. of water) and then with a solution of 20 g. of $CaCl_2$ in 50 ml. of water. There was obtained 15 ml. of yellow oil which had an $n_D^{20}$ 1.4190. Infrared analysis of this oil indicated that is was mainly methyl methacrylate and contained some iron pentacarbonyl.

On heating the residue in the distillation vessel to between 100° and 200° C. there was obtained 4.2 g. of a liquid boiling at 35° to 150° C./0.2 to 0.1 mm. Redistillation of this liquid gave 1.0 ml. of a colorless liquid, B. P. 46° C./0.6 mm, $n_D^{25}$ 1.4682–1.4685. Examination of this material in the infrared showed absorption at $5.75\mu$ for carbonyl unsaturation and at $6.1\mu$ for the conjugated $>C=C<$ structure.

Example II

A stainless steel pressure vessel of 400 ml. capacity was flushed with nitrogen, charged with 150 ml. of methanol and 3 ml. of iron pentacarbonyl. The vessel was sealed, cooled, and evacuated. Allene (40 g.) was added by distillation and carbon monoxide was admitted to a pressure of 300 atmospheres. The contents of the vessel was heated at 180–190° C. for approximately 12 hours, while repressuring with carbon monoxide to approximately 900 atmospheres. The total pressure drop corresponded to 255 atmospheres. The resulting yellow-red liquid weighed 173.5 g. It was flash-distilled to give 131 g. of yellow liquid and 39 g. of brown, viscous residue (A).

The distillate was washed twice with saturated calcium chloride solution and the organic layer (32.2 g.) was distilled through a Vigreux column. There was obtained 24.8 g. of yellow oil, B. P. 50–52° C./120 mm., $n_D^{25}$ 1.4113, and a higher boiling fraction, B. P. 52° C./120 mm.–68° C./30 mm. Infrared analysis of the yellow oil indicated it to be methyl methacrylate containing some iron carbonyl.

The higher boiling cut was combined with that from a similar preparation. The product was fractionally distilled. The fraction boiling at 66° C./33 mm., $n_D^{25}$ 1.4376, was identified as methyl 1-methyl-3-methylene-cyclobutanecarboxylate by infrared analysis. This product is formed by the condensation of allene with methyl methacrylate.

Infrared analysis of the non-volatile product (A) indicated that it was a polymer containing carbomethoxy groups.

Example III

A silver-lined pressure tube of 400 ml. capacity was charged with 2 g. of diruthenium nonacarbonyl catalyst and 150 ml. of methanol. The reactor was flushed with nitrogen, cooled, and evacuated. Allene (40 g.) was added by distillation. The reactor was pressured with carbon monoxide to a pressure of 300 atmospheres and then heated to 135° C. During a reaction period of 12 hours (during which time the temperature was maintained at 135–150° C. and the pressure at 800–900 atmospheres by periodically adding carbon monoxide as needed) there was a total observed pressure drop of about 885 atmospheres. After reaction was complete, the reaction mixture was removed from the reactor.

The resulting product contained a small amount of solid and weighed 173 g. It was distilled at reduced pressure to separate it from the catalyst. Refractionation yielded 45.2 g. of methyl methacrylate, B. P. 61–62° C./190 mm., $n_D^{27}$ 1.4110. The identity of the product was confirmed by infrared analysis. In addition, there was obtained 6.3 g. of a colorless liquid, B. P. 58–60° C./1 mm., $n_D^{25}$ 1.4560 and 6 g. of a higher boiling residue.

*Example IV*

A pressure vessel of 400 ml. capacity was charged with 150 ml. of methanol and 1.5 g. of diruthenium nonacarbonyl. The vessel was flushed with nitrogen and sealed. It was then cooled to −60° C. and 40 g. of allene was added by distillation. Carbon monoxide was added at room temperature to a pressure of 300 atmospheres and the charged reactor heated at 140° C. for 2 hours. The total pressure drop during this period corresponded to 60 atm. The temperature was thereafter raised to 200° C., where it was held for 3 additional hours. A further pressure drop of 30 atm. was noted during this time. The resulting yellow-red liquid was filtered to free it of a small amount of insoluble material, and the filtrate was distilled. Approximately 130 ml. of product (A), B. P. 20–60° C./35 mm, was collected, and 36.9 g. of a colorless oil, B. P. 40–100° C./0.2 mm. (B). There remained in the distillation vessel 25.2 g. of higher boiling product.

A portion of (A) was washed with aqueous calcium chloride. Methyl methacrylate was detected by its characteristic odor in the resulting water-insoluble oil.

(B) was redistilled to give 22.1 g. of colorless oil, B. P. 50° C./0.09 mm., $n_D^{25}$, 1.4455–1.4457. The infrared and proton resonance spectra of this material were consistent for dimethyl-2,2-dimethyl-4-methyleneglutarate, lit. B. P. 136–138° C./50 mm., $n_D^{25}$ 1.4440. The ester obtained was hydrogenated at room temperature over a platinum catalyst to give dimethyl-2,2,4-trimethylglutarate, B. P. 71° C./2.2 mm., $n_D^{25}$, 1.4283, lit. B. P. 113° C./24 mm., $n_D^{25}$, 1.4272. For further identification the saturated ester was hydrolyzed to 2,2,4-trimethylglutaric acid, M. P. 98–98.8° C., lit. M. P. 98.5–99.5° C.

*Example V*

A 400 ml. pressure reactor was charged with 100 ml. of methanol and 0.786 g. (0.003 mole) of ruthenium trichloride trihydrate. The reactor was flushed with nitrogen, cooled, and evacuated and 40 g. of allene was distilled thereinto. The system was then pressured with carbon monoxide to give a pressure of 800 atmospheres at 150° C. The charged reactor was shaken for 10 hours at 150° C. A pressure drop of 285 atmospheres was observed during this period. There was obtained 131 g. of clear, red, reaction product, which was distilled rapidly at 1–2 mm. pressure through a 12" Vigreux column. A 100 g. fraction, condensed in a trap cooled in a solid carbon dioxide acetone mixture and 12.5 g. distilled over at 50°–115° C./1 mm. This fraction had a refractive index of 1.4570. Infrared analysis showed that it contained carbon-carbon unsaturation, carbonyl, and ether (acetal) functionality. A black higher boiling residue of 11.5 g. was retained in the distilling flask.

The 100 g. fraction obtained, as above, was added to a concentrated solution of calcium chloride in water, and 57 g. (60 ml.) of organic phase was separated. The product obtained had $n_D^{25}$, 1.4105 (methyl methacrylate $n_D^{20}$, 1.4130); it was dried over anhydrous calcium chloride and fractionally distilled through a 15" packed column. A 5 ml. foreshot, B. P. 48–54° C./193–149 mm., $n_D^{25}$, 1.4090, was removed and the remainder of the product distilled at 54–55° C./144–148 mm., $n_D^{25}$, 1.4115. The infrared absorption spectrum of this product shows it to be methyl methacrylate.

The alcohols used in preparing the esters of this invention are the monohydric alkanols and the cycloalkanols. Preferred alcohols are the monohydric alkanols containing from 1–6 carbons and monohydric cycloalkanols of up to 7 carbon atoms. Examples are methanol, ethanol, propanol, butanol, and isopropanol, cyclohexanol, methylcyclohexanol, and the like. The products employing these alcohols are the corresponding alkyl and cycloalkyl esters of methacrylic acid.

The process of this invention is operated under a pressure which may vary from 100–3000 atmospheres or more but is generally from 300–1000 atmospheres, because under these conditions the reaction takes place at a reasonable rate with the production of the desired ester in good yield.

The temperature at which the reaction is carried out is from 120–250° C. Since good reaction rates with good yields of desired products are obtained in the more restricted range of 130–225° C. the process is usually operated within this range.

The amount of catalyst which may be employed may be varied widely but is at least 1% by weight of the allene. Usually better results are obtained using at least 5% of the catalyst on the weight of the allene. No practical advantages accrue from the use of more than 30%, by weight of the allene, of catalyst and this represents a practical upper limit of catalyst concentration.

The catalyst used in the practice of this invention is a ruthenium or iron carbonyl, e. g. iron pentacarbonyl, diiron nonacarbonyl, triiron dodecacarbonyl, ruthenium pentacarbonyl, diruthenium nonacarbonyl and triruthenium dodecacarbonyl. These carbonyls can be preformed or they can be formed in situ from carbon monoxide and a metal carbonyl precursor, as illustrated in Example V. A particularly useful method for preparing metal carbonyls is by reaction of carbon monoxide with the metal in reactive form, as described in J. Am. Chem. Soc. 70, 383–6 (1948).

The reaction between the allene, carbon monoxide, and alcohol may be carried out either batchwise, as illustrated in the examples, or semi-continuously, or continuously.

The relative proportions of reactants employed may be the stoichiometrically required quantities but this is not critical and amounts varying widely from these quantities may be used, if desired. Thus, the alcohol, allene or carbon monoxide may be used in excess. When the alcohol is used in large excess over the stoichiometric amount it also functions as a reaction medium.

An inert reaction medium may be included in the charge in addition to the alcohol but this is not necessary. Examples of suitable reaction media which can be used are cyclohexane, xylene, benzene, isooctane, dioxan, tetrahydrofuran, and the like.

The time of reaction may be as short as 30 minutes or as long as 30 hours. Usually, however, the reaction is carried on until there is no further pressure drop. In order to insure maximum utilization of the allene component of the reaction, it is generally desirable to inject carbon monoxide as required to maintain the pressure at the level selected for operation.

The process of this invention is efficient and makes possible the production of carboxylic acid esters, and particularly of methacrylic acid esters from cheap, abundantly available alcohols, allene, and carbon monoxide.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Process for preparing esters of alpha-methylene carboxylic acids which comprises reacting allene and a monohydric alcohol selected from the class consisting of alkanols and cycloalkanols with carbon monoxide under a pressure of at least 100 atmospheres at a temperature of 120 to 250° C. and in contact with a metal carbonyl catalyst selected from the class consisting of iron carbonyls and ruthenium carbonyls.

2. Process for preparing esters of alpha-methylene carboxylic acids which comprises reacting allene and a monohydric alkanol of 1 to 6 carbon atoms with carbon monoxide under a pressure of at least 100 atmospheres at a temperature of 120 to 250° C. and in contact with a metal carbonyl catalyst selected from the class consisting of iron carbonyls and ruthenium carbonyls.

3. Process for preparing esters of alpha-methylene carboxylic acids which comprises reacting allene and a monohydric cycloalkanol of up to 7 carbon atoms with carbon monoxide under a pressure of at least 100 atmospheres at a temperature of 120 to 250° C. and in contact with a metal carbonyl catalyst selected from the class consisting of iron carbonyls and ruthenium carbonyls.

4. Process for preparing methacrylic acid esters which comprises reacting allene and a monohydric alkanol with carbon monoxide under a pressure of at least 100 atmospheres at a temperature of 120 to 250° C. and in contact with a metal carbonyl catalyst selected from the class consisting of iron carbonyls and ruthenium carbonyls.

5. Process for preparing methacrylic acid esters which comprises reacting allene and a monohydric alkanol of 1 to 6 carbon atoms with carbon monoxide under a pressure of at least 100 atmospheres at a temperature of 120 to 250° C. and in contact with an iron carbonyl catalyst.

6. Process for preparing methacrylic acid esters which comprises reacting allene and a monohydric alkanol of 1 to 6 carbon atoms with carbon monoxide under a pressure of at least 100 atmospheres at a temperature of 120 to 250° C. and in contact with a ruthenium carbonyl catalyst.

7. Process for preparing methacrylic acid esters which comprises reacting allene and a monohydric alkanol of 1 to 6 carbon atoms with carbon monoxide under a pressure of 300 to 1000 atmospheres at a temperature of 130 to 225° C. and in contact with a metal carbonyl catalyst selected from the class consisting of iron carbonyls and ruthenium carbonyls.

8. Process for preparing methyl methacrylate which comprises reacting allene and methanol with carbon monoxide under a pressure of at least 100 atmospheres at a temperature of 120 to 250° C. and in contact with a metal carbonyl catalyst selected from the class consisting of iron carbonyls and ruthenium carbonyls.

9. Process for preparing methyl methacrylate which comprises reacting allene and methanol with carbon monoxide under a pressure of 300 to 1000 atmospheres at a temperature of 130 to 225° C. and in contact with an iron carbonyl catalyst.

10. Process for preparing methyl methacrylate which comprises reacting allene and methanol with carbon monoxide under a pressure of 300 to 1000 atmospheres at a temperature of 130 to 225° C. and in contact with a ruthenium carbonyl catalyst.

References Cited in the file of this patent

Copenhaver et al.: "Acetylene and Carbon Monoxide Chemistry" (1949), pp. 251, 255, 295, 299.

Raphael: "Acetylenic Compounds in Organic Synthesis" (1955), pp. 137–8.

Greenfield: Dissertation, Abstr. 15 (1955), p. 699.